United States Patent [19]

Logvinenko et al.

[11] 3,774,885
[45] Nov. 27, 1973

[54] METHOD FOR PREPARING LIQUID MIXTURES IN MANUFACTURE OF LATEX ARTICLES

[76] Inventors: Dmitry Danilovich Logvinenko, ulitsa Kalinina, 5, kv. 5, Poltava; Alexei Dmitrievich Chugai, ulitsa Gvardeiskaya, 21, Kiev; Karl Lazarevich Tsantker, ulitsa Gogolya, 19, kv. 4, Poltava; Ljudmila Efimovna Chechik, ulitsa Krasnoarmeiskaya, 58, kv. 2, Kiev; Oleg Parfirovich Shelyakov, ulitsa Kalinina, 5, kv. 100, Poltava; Mikhailovna Belonozhko, ulitsa Frunze, 108, kv. 4, Poltava; Ekaterina Alexandrovna Morozko, ulitsa K.Libknekhta, 22, Poltava; Ljudmila Nikolaevna Kuzmina, ulitsa Almaznaya, 4, kv. 191, Poltava, all of U.S.S.R.

[22] Filed: Nov. 9, 1971

[21] Appl. No.: 197,103

[30] Foreign Application Priority Data
May 17, 1971 U.S.S.R.............................. 1652664

[52] U.S. Cl............. 259/1 R, 259/DIG. 46, 259/99, 260/819
[51] Int. Cl........................... C08c 1/18, B01f 13/08
[58] Field of Search..................... 259/1 R, DIG. 46, 259/99, 100, 102, 112; 260/819, 820, 821, 822

[56] References Cited
UNITED STATES PATENTS

| | | | |
|---|---|---|---|
| 2,350,534 | 6/1944 | Rosinger...................... | 259/DIG. 46 |
| 3,219,318 | 11/1965 | Hershler........................... | 259/1 R |
| 2,951,689 | 9/1960 | Asp et al...................... | 259/DIG. 46 |
| 2,844,363 | 7/1958 | Clark........................... | 259/DIG. 46 |

*Primary Examiner*—John Petrakes
*Assistant Examiner*—Alan I. Cantor
*Attorney*—Holman & Stern

[57] ABSTRACT

A method for preparing liquid mixtures in the manufacture of latex goods in which the components entering the mixture are brought together and then mixed with the aid of ferromagnetic objects acted upon by a rotating electromagnetic field with subsequent separation of the said ferromagnetic objects from the obtained mixture by any of the known methods.

2 Claims, No Drawings

METHOD FOR PREPARING LIQUID MIXTURES IN MANUFACTURE OF LATEX ARTICLES

This invention relates to the methods for preparing liquid mixtures and, more particularly, to the method for preparing liquid mixtures in the manufacture of latex goods. The invention can be used in rubber industry for the manufacture of various latex articles (gloves, membranes, etc).

Methods are known in the prior art for the preparation of liquid mixtures in the manufacture of latex goods, for example, the method for preparing a mixture of carbon black with a water solution of resorcinolformaldehyde resin prepared preliminarily by the interaction between formaldehyde and multi-base phenols.

In the realization of this method, carbon black is first mixed with the aqueous solution of resorcinolformaldehyde resin in a colloid mill, after which the obtained mixture of carbon black and the resin is mixed with latex in a mixer at a pressure from 35 to 560 kg/sq.cm.

The disadvantage of this method is the impossibility of preparing liquid mixtures of carbon black with latex unless water-soluble phenol resins are added. However the addition of the phenol resins impairs the properties of the latex articles.

Furthermore, said prior art method requires additional expenditures in the preparation of soluble phenol resins by chemical methods, in building up high pressures and also in the complicated and insufficiently effective process equipment.

An object of the present invention is to devise a method for preparing liquid mixtures in the manufacture of latex goods without the use of emulsifying agents which impair the properties of latex goods and with the employment of equipment of comparatively simple design and sufficient productive capacity.

The invention is aimed at attaining a method for preparing liquid mixtures in the manufacture of latex goods in which, according to the invention, the components of the mixtures are brought together and mixed with the aid of ferromagnetic objects upon which a rotating electromagnetic field acts, with subsequent separation of the said objects from the prepared mixtures by any of the known methods.

It is recommended that the strength of the magnetic induction of the rotating electromagnetic field in the reaction mixture containing the said components should be not less than 0.08 Tesla.

In order to prevent the ingress of colloid metal into the latex mixture, ferromagnetic objects coated with polymers should preferably be used.

The present invention can be realized as follows: A mixture containing an aggregate, water and ferromagnetic particles, for example, steel or iron, protected with a polymer coat (for example, PVC coat) is acted upon with a running, for example, rotating electromagnetic field, having a strength of 0.08 to 0.15 Tesla. The speed of the electromagnetic field rotation is 3,000 r.p.m.

As a result of this electromagnetic action, the ferromagnetic particles are set up in an intense motion to form the so-called vortex layer to effect the mixing and dispersing the components. At the same time, the particles oscillate electromagnetically and generate acoustic oscillations in the environing medium. Strong local, quickly alternating magnetic fields are generated in the zone of each ferromagnetic particle.

The complex action of these factors produces active centres on the surface of the solid particles. Then, the mixture of the aggregate and water is blended with the latex mixture of rubber as was described above. Strong bonds are formed between the aggregate particles and the latex globules to improve physical and mechanical properties of latex goods. Next, the ferromagnetic particles are separated from the prepared mixture, for example, with the aid of a magnetic separator, and the latex articles are shaped.

The proposed method has certain advantages over those known in the prior art. It can be used for the manufacture of latex goods with improved physical and mechanical properties. Latex goods produced on the basis of liquid mixtures by the proposed method have a lower cost owing to the use of cheap natural materials which can be used as the filling material without any emulsifying agents. The proposed method ensures preparation of a stable mixture of kaolin with an aqueous solution of calcium chloride used as a fixing agent in the manufacture of latexes by the method of ionic deposition. The mixture does not settle out for several days, which reduces the defects in the latex production. The equipment for realization of the proposed method is very simple from the point of view of its design; the process for the preparation of liquid mixtures is continuous and can be easily automated.

For a better understanding of the invention by those skilled in the art, the following practical embodiments of the proposed method are given by way of illustration.

Example 1

A mixture of 150 g of kaolin, 350 ml of water and 180 g of steel ferromagnetic particles (10.5 mm long and 1.2 mm in diameter) protected with a PVC coat was placed into a 1.5 litre-capacity reaction vessel. The reaction vessel was then put into a zone of a quickly rotating electromagnetic field for 15 minutes. The thus prepared mixture of kaolin with water was mixed with a latex mixture (15 parts by weight of kaolin with reference to dry weight of chloroprene rubber) in a layer of ferromagnetic particles with simultaneous action of the rotating electromagnetic field for 10 seconds, after which the ferromagnetic particles were separated from the latex mixture with the aid of a magnetic separator.

Filled latex films were prepared by the method of ionic deposition from the thus prepared latex mixture, with subsequent drying at a temperature of 70°C for one hour and curing at 120°C for 2 hours.

The results of physical and mechanical tests of the thus prepared films show that the proposed method for preparing liquid mixtures in the manufacture of latex articles ensures the combination of a latex mixture of chloroprene rubber with a cheap natural aggregate (kaolin) and thus strengthens considerably latex films and hence improves the quality of latex goods (the tensile strength of non-filled latex articles is 124 kg/sq.cm, whereas the strength of kaolin-filled latex films produced by the proposed method is 190 kg/sq.cm, the other indices being the same).

Example 2

A mixture of 60 g of carbon black (DR-100), 440 ml of water and 100 g of steel ferromagnetic particles, 10.5 mm long and 1.2 mm in diameter, not protected with PVC, was placed into a reaction vessel, and placed in the zone of action of the rotating electromagnetic field for one minute. Thus prepared mixture was brought together with cloroprene rubber (10 parts by weight of carbon black with reference to the dry latex) in a layer of the ferromagnetic particles for 10 seconds, after which the ferromagnetic particles were separated from the latex mixture.

Latex films produced by the method of ionic deposition (see Example 1) were obtained from the thus prepared latex mixture. The results of physical and mechanical tests of the films show that the proposed method for preparing liquid mixtures in the manufacture of latex articles ensures a combination of chloroprene rubber with carbon black without the use of any special emulsifying agents and ensures higher strength of latex films (the tensile strength of latex films filled with carbon black is 354 kg/sq.cm, whereas that of non-filled chloroprene films is only 124 kg/sq.cm).

Example 3

A mixture of 100 g of aerosil-175, 400 ml of water and 180 g of steel ferromagnetic particles coated with PVC (size as indicated in Example 1) was placed into a reaction vessel having the capacity indicated in Example I. The vessel was then put into a zone of a running electromagnetic field for 5 minutes.

The prepared mixture was brought together with chloroprene rubber latex (20 parts by weight of aerosil with reference to dry latex weight) in the layer of the same ferromagnetic particles for ten seconds.

After separation of the ferromagnetic particles from the latex mixture filled with aerosil, latex films were produced by the method of ionic deposition.

The results of physical and mechanical tests of the films have shown that the proposed method for preparing mixtures in the manufacture of latex goods ensures the production of stronger films, that is improves the quality of latex goods (the tensile strength of non-filled latex films was 124 kg/sq.cm, whereas that of the aerosil-filled films was 238 kg/sq.cm), the other properties of the film being the same.

Example 4

A mixture of components entering the composition of a fixing agent used in the manufacture of latex articles by the method of ionic deposition having the following composition

| | |
|---|---|
| calcium chloride | 50 g |
| kaolin | 140 g |
| water | 310 g | was placed into a reaction vessel. Next 100 g of steel ferromagnetic particles of the said dimensions coated with PVC were added to the mixture and placed into the zone of a rotating electromagnetic field for ten minutes.

Latex films were prepared with the thus obtained fixing agent by the method of ionic deposition.

The results of physical and mechanical tests of the films show that the latex films prepared with the "magnetic" fixing agent have higher strength (some 20–25 per cent higher) compared with control films prepared with non-treated fixing agent.

Moreover, the proposed method for preparing fixing agent ensures even distribution of the positively charged calcium ions over the surface of kaolin, which in turn ensures better homegeneity of latex films (with respect to thickness). Thickness variations of films produced with non-treated fixing agent is 9 per cent, whereas those in films produced with the "magnetic" fixing agent is only 3 per cent.

What is claimed is:

1. A method for preparing liquid mixtures in the manufacture of latex goods which comprises:
   a. preparing a mixture of an aggregate material, water and ferromagnetic particles;
   b. placing the mixture in the zone of action of a rotating electromagnetic field;
   c. blending a latex material with the mixture; and
   d. separating the ferromagnetic particles from the mixture.

2. A method as of claim 1, in which the induction of the said rotating electromagnetic field is not less than 0.08 Tesla.

* * * * *